United States Patent
Aoshima et al.

(10) Patent No.: US 7,317,069 B2
(45) Date of Patent: Jan. 8, 2008

(54) ALIPHATIC POLYESTER AND PROCESS FOR PRODUCING THE SAME

(75) Inventors: Takayuki Aoshima, Kanagawa (JP); Toyomasa Hoshino, Kanagawa (JP); Tadashi Uyeda, Mie (JP); Yasuaki Miki, Mie (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 11/282,622

(22) Filed: Nov. 21, 2005

(65) Prior Publication Data

US 2006/0155100 A1 Jul. 13, 2006

Related U.S. Application Data

(63) Continuation of application No. PCT/JP2004/007135, filed on May 19, 2004.

(30) Foreign Application Priority Data

May 21, 2003 (JP) ............................ P2003-142914

(51) Int. Cl.
- *C08G 63/00* (2006.01)
- *C08G 63/12* (2006.01)
- *C08G 63/16* (2006.01)
- *C08K 3/00* (2006.01)
- *C08F 2/44* (2006.01)
- *C08F 2/00* (2006.01)

(52) U.S. Cl. ...................... 528/275; 528/277; 528/296; 528/302; 524/780

(58) Field of Classification Search ................ 528/275, 528/277, 296, 302; 524/780; 526/65

See application file for complete search history.

(56) References Cited

U.S. PATENT DOCUMENTS

| | | | | |
|---|---|---|---|---|
| 5,314,969 A | * | 5/1994 | Imaizumi et al. | 525/440 |
| 5,324,794 A | * | 6/1994 | Taka et al. | 525/440 |
| 5,348,700 A | * | 9/1994 | Nakamura et al. | 264/177.17 |
| 5,436,056 A | * | 7/1995 | Takiyama et al. | 428/141 |
| 5,714,569 A | | 2/1998 | Imaizumi et al. | |

FOREIGN PATENT DOCUMENTS

JP 5-170885 7/1993

* cited by examiner

*Primary Examiner*—Nathan M. Nutter
(74) *Attorney, Agent, or Firm*—Oblon, Spivak, McClelland, Maier & Neustadt, P.C.

(57) ABSTRACT

An object of the present invention is to provide an aliphatic polyester which is produced as a high-molecular-weight one without using a chain extender such as an isocyanate compound or a carbonate compound and is excellent in moldability in injection molding, blow molding, or extrusion molding, thermal stability, and mechanical properties such as tensile properties.

The invention relates to an aliphatic polyester comprising an aliphatic diol unit, an aliphatic dicarboxylic acid unit, and a unit of an organic acid having a pKa value of 3.7 or below at 25° C., wherein a content of a carbonate bond contained in the polyester is less than 1 mol %, a content of a urethane bond is less than 0.06 mol %, a content of an aliphatic monooxymonocarboxylic acid unit is less than 0.02 mol %, a content of the phosphorus atom derived from a phosphorus compound selected from among organic phosphinic acids, organic phosphonic acids, and hydrogen phosphate salts is less than $10^{-9}$ mol %, based on the whole monomer units constituting the polyester, and a reduced viscosity ($\eta$sp/C) is 1.6 or more.

19 Claims, No Drawings

ALIPHATIC POLYESTER AND PROCESS FOR PRODUCING THE SAME

FIELD OF THE INVENTION

The present invention relates to an aliphatic polyester and a process for producing the same. More specifically, it relates to an aliphatic polyester which is produced as a high-molecular-weight one without using a chain extender such as an isocyanate compound or a carbonate compound and is excellent in moldability in injection molding, blow molding, or extrusion molding, thermal stability, and tensile properties as well as which has an excellent biodegradability and is good for the environment, and a process for producing the same.

BACKGROUND ART

Because of an increasing interest in environmental issues, aliphatic polyesters having biodegradability have been intended to apply to fibers, molded articles, films, sheets, and the like, as resins for further avoiding environmental burden. For example, since polybutylene succinate and/or polybutylene adipate having biodegradability have mechanical properties resemble to those of polyethylene, they have been developed as alternative polymers for polyethylene.

As an economically advantageous process for producing an polyester, there is known and adopted since a long time ago a process for producing a polyester having a high degree of polymerization wherein an ester oligomer is produced by a direct esterification reaction of a dicarboxylic acid with a diol or an ester exchange reaction of an alkyl ester of a dicarboxylic acid with a diol in the presence of a catalyst and then the polyester having a high degree of polymerization is produced by subjecting the oligomer to an ester exchange reaction under heating and under reduced pressure with removing the diol formed by distillation.

However, since thermal stability of an aliphatic polyester is generally low and hence a decrease of the molecular weight due to thermal degradation is caused during the polymerization reaction, it is impossible to obtain a polyester having a high degree of polymerization which has a practically sufficient strength by a conventional process for producing the polyester. It is proposed that the concentration of the polymer terminal (hydroxyl group or carboxyl group), particularly the remaining carboxyl group remarkably affects adversely thermal stability of polymer (e.g., cf. Patent Document 1). Based on such a background, various kinds of contrivance are applied to the production process.

For example, there are proposed processes for enhancing melt viscosity of the polymer through extension of the polymer chain length by carrying out melt polymerization using a titanium compound or a zirconium compound as a catalyst with adding a diisocyanate (e.g., cf. Patent Document 2) or a diphenyl carbonate (e.g., cf. Patent Document 3). Since these processes of adding the chain extenders can easily increase the molecular weight of the polyester, the processes are apparently considered to be effective production processes for aliphatic polyesters but there are problems that the reaction is carried out in two steps and thus is complicated and also, with regard to the resulting polyester, in addition to a slight decrease of crystallinity and melting point thereof, biodegradability of the resulting polyester tends to decrease owing to the urethane bond contained in the molecule.

Moreover, there is disclosed a process of converting the structure of the polyester into a crosslinked structure by adding a trifunctional oxycarboxylic acid in an amount of 0.5 to 5 mol % or a tetrafunctional oxycarboxylic acid in an amount of 0.1 to 3 mol % as a branching agent (e.g., cf. Patent Document 4). However, the polyester wherein melt viscosity is enhanced by introducing a large amount of the trifunctional or tetrafunctional oxycarboxylic acid as above exhibits a tendency to increase the concentration of the polymer terminal (hydroxyl group or carboxyl group) which is a cause for decreasing thermal stability and also has insufficient practical physical properties. Therefore, in most cases, there is applied contrivance that the terminal number in the polymer is reduced and also the molecular weight of the polymer is enhanced by adding a diisocyanate at the late stage of the polymerization (e.g., cf. Patent Document 5).

Furthermore, there is also proposed an aliphatic polyester wherein elasticity is enhanced by incorporating a dibasic acid having a hydroxyl group into an aliphatic polyester in an amount of 0.05 to 5% by weight (e.g., cf. Patent Document 6). Since the actually produced polyester in the Example has a content of the dibasic acid of so much as 1 to 2 mol %, thermal stability thereof tends to decrease and also, as mentioned above, a chain extension is conducted by further adding a diisocyanate.

Additionally, it is proposed that, as a polyester carbonate, by reducing the content of specific dicarboxylic acid impurities including malic acid as a trifunctional oxycarboxylic acid in the starting dicarboxylic acids to 0.4% by weight or less, reproducibility of the amount of gel formation, thermal stability, color tone, and moldability at the molding of the polyester carbonate is improved (e.g., cf. Patent Document 7). In this case, the lesser total content of dicarboxylic acid impurities (malic acid, maleic acid, and fumaric acid) is considered to be preferable but a polyester having a high degree of polymerization is also not obtained in this case, so that a carbonate compound which is an chain extender is still added.

On the other hand, there are proposed several processes for producing a high-molecular-weight one without using a chain extender such as an isocyanate or a carbonate.

For example, in order to enhance the rate of the polymerization reaction, there are disclosed a process of carrying out dehydrative condensation with azeotropic removal of water formed during the reaction and an organic solvent in the solvent using a tin compound as a catalyst (e.g., cf. Patent Document 8) and a process of carrying out a polycondensation reaction under vary high vacuum of 0.005 to 0.1 mmHg (e.g., cf. Patent Document 9). However, since these production processes, especially the latter process produce a polyester substantially having hydroxyl group terminals, they are expected as processes for producing polyesters excellent in thermal stability from the aforementioned viewpoints but have disadvantages that not only the production steps are complicated but also extremely large investment in facilities is necessary. Moreover, since this process takes a long period of time for production of the polyester having a high degree of polymerization, there are fears of thermal degradation and coloration of the polymer during the production.

Furthermore, as the other process, there is proposed a catalyst system of combining a proton-releasing phosphorus compound such as an organic phosphinic acid and a hydrogen phosphate salt and a polymerization catalyst (e.g., cf. Patent Document 10). These proton-releasing acidic compounds not only generate by-products such as tetrahydrofuran from starting butanediol (Encyclopaedia Chimica, vol. 7, p. 850, Kyoritsu Shuppan (1962)) but also possibly deteriorate thermal stability and hydrolysis resistance of the polyester by increasing acid concentration in the final product.

As a method for overcoming such various problems, the present applicant has proposed that a polyester having a high degree of polymerization can be easily produced by adding a bifunctional oxycarboxylic acid such as lactic acid to the polymerization components to form a ternary system (1,4-butylene glycol, succinic acid, and lactic acid) or a quaternary system (1,4-butylene glycol, succinic acid, adipic acid, and lactic acid) and using a Ge-based catalyst as a catalyst (e.g., cf. Patent Document 11). Moreover, for the purpose of further enhancing melt viscosity, a process of adding a trifunctional oxycarboxylic acid to the above polymerization systems has been proposed (e.g., cf. Patent Document 12). However, in the process of adding lactic acid to these polymerization system, since lactide which is a cyclic dimer of lactic acid is apt to be generated at the heating, during the polymerization reaction, not only problems such as blockage of reaction tubes are sometimes induced but also a polyester containing a lactic acid component has a slight odor of lactic acid or thermal degradation and coloration are caused owing to generation of lactide or the like under a high temperature condition in some cases.

Furthermore, such an aliphatic polyester exhibiting biodegradability generally has a characteristic that it is apt to undergo a hydrolysis reaction and hence there still remains a problem of improving durability of mechanical properties such as tensile properties for relatively long-term storage and use. As a method for improving hydrolysis resistance, there is proposed a method of mixing an aliphatic polyester with a carbodiimide compound (e.g., cf. Patent Document 13). However, the effect is not sufficient, for example, the tensile elongation percentage at break decreases to less than 50% of the initial value after four weeks of test, and thus there is practically a serious problem.

[Patent Document 1]
JP-A-7-53700

[Patent Document 2]
JP-A-4-189822

[Patent Document 3]
JP-A-8-301999

[Patent Document 4]
JP-A-5-170885

[Patent Document 5]
JP-A-5-178956

[Patent Document 6]
JP-A-5-271377

[Patent Document 7]
JP-A-11-60709

[Patent Document 8]
JP-A-9-77862

[Patent Document 9]
JP-A-5-310898

[Patent Document 10]
JP-A-2002-187943

[Patent Document 11]
JP-A-8-239461

[Patent Document 12]
JP-A-8-259679

[Patent Document 13]
JP-A-11-80522

DISCLOSURE OF THE INVENTION

An object of the invention is to provide a polyester which is produced as a sufficiently high-molecular-weight one by a simple and convenient production process without using a chain extender such as an isocyanate compound or a carbonate compound and a large amount of a branching agent, an acidic phosphorus compound, and the like causing decrease in physical properties such as thermal stability and which has sufficient tensile properties, especially tensile elongation property of molded film and thermal stability.

As a result of the extensive studies in consideration of the above circumstances, the present inventors have enabled the production of the polyester having a sufficiently high molecular weight and excellent in environmental properties with using substantially no starting materials affecting adversely physical properties, such as a chain extender and an acidic phosphorus compound and without using a large amount of a branching agent.

Namely, the gist of the invention lies on an aliphatic polyester comprising an aliphatic diol unit, an aliphatic dicarboxylic acid unit and a unit of an organic acid having a pKa value of 3.7 or below at 25° C., wherein a content of a carbonate bond contained in the polyester is less than 1 mol %, a content of a urethane bond is less than 0.06 mol %, a content of an aliphatic monooxymonocarboxylic acid unit is less than 0.02 mol %, a content of the phosphorus atom derived from a phosphorus compound selected from among an organic phosphinic acid, an organic phosphonic acid, and a hydrogen phosphate salt is less than $10^{-9}$ mol %, based on the whole monomer units constituting the polyester, and a reduced viscosity ($\eta$sp/C) is 1.6 or more.

Since the polyester of the invention is produced as a sufficiently high-molecular-weight one by a simple and convenient production process without using a chain extender such as an isocyanate compound or a carbonate compound, the polyester is excellent in environmental properties and also excellent in moldability in injection molding, blow molding, or extrusion molding, and mechanical properties such as thermal stability and tensile properties.

BEST MODE FOR CARRYING OUT THE INVENTION

The following will explain the present invention in detail.

(Aliphatic Diol Unit)

The aliphatic diol unit constituting the aliphatic polyester of the invention is not particularly limited as far as it is derived from an aliphatic and alicyclic compound component having two OH groups but there may be mentioned an aliphatic diol having a lower limit of the carbon number of 2 or more and an upper limit of usually 10 or less, preferably 6 or less.

Specific examples of the aliphatic diol include ethylene glycol, 1,3-propylene glycol, neopentyl glycol, 1,6-hexamethylene glycol, decamethylene glycol, 1,4-butanediol, 1,4-cyclohexanedimethanol, and the like. These may be used solely or as a mixture of two or more of them.

Of these, ethylene glycol, 1,4-butanediol, 1,3-propylene glycol, and 1,4-cyclohexanedimethanol are preferred. In particular, ethylene glycol and 1,4-butanediol are preferred and furthermore 1,4-butanediol is particularly preferred.

Moreover, in addition to the above aliphatic diols, aromatic diols may be used in combination as diol components. The aromatic diol is not particularly limited as far as it is an aromatic compound having two OH groups but there may be mentioned an aromatic diol having a lower limit of the carbon number of 6 or more and an upper limit of usually 15 or less. Specific examples of the aromatic diol include hydroquinone, 1,5-dihydroxynaphthalene, 4,4'-dihydroxydiphenyl, bis(p-hydroxyphenyl)methane, bis(p-hydroxyphenyl)-2,2-propane, and the like. The content of these aromatic diols is usually 30 mol % or less, preferably 20 mol % or less, more preferably 10 mol % or less in the total amount of the diols.

Furthermore, a polyether having hydroxyl end groups may be used in combination with the above aliphatic diol. As the polyether having hydroxyl end groups, the carbon number has a lower limit of usually 4 or more, preferably 10 or more and an upper limit of usually 1,000 or less, preferably 200 or less, more preferably 100 or less. Specific examples of the polyether having hydroxyl end groups include diethylene glycol, triethylene glycol, polyethylene glycol, polypropylene glycol, polytetramethylene glycol, poly-1,6-hexamethylene glycol, and the like. Moreover, copolymerized polyether of polyethylene glycol and polypropylene glycol, and the like can be also used. These polyethers having hydroxyl end groups can be usually used in the amount of 90% by weight or less, preferably 50% by weight or less, more preferably 30% by weight or less in the polyester.

(Aliphatic Dicarboxylic Acid Unit)

The aliphatic dicarboxylic acid unit constituting the aliphatic polyester of the invention is derived from an aliphatic dicarboxylic acid and/or a derivative thereof. As the aliphatic dicarboxylic acid, specifically, there may be usually mentioned a linear or alicyclic dicarboxylic acid having 2 to 12 carbon atoms, such as oxalic acid, malonic acid, succinic acid, glutaric acid, adipic acid, suberic acid, sebacic acid, cyclohexanedicarboxylic acid, and the like. Moreover, as the derivatives of the aliphatic dicarboxylic acid, there may be used lower alkyl esters such as methyl esters, ethyl esters, propyl esters, butyl esters, and the like esters of the above aliphatic dicarboxylic acids and cyclic acid anhydrides of the above aliphatic dicarboxylic acids, such as succinic anhydride. These may be used solely or as a mixture of two or more of them. Of these, as the aliphatic dicarboxylic acid, adipic acid, succinic acid, or a mixture thereof is preferred and as the derivative of the aliphatic dicarboxylic acid, a methyl ester of adipic acid or succinic acid or a mixture thereof is preferred.

With regard to the aliphatic polyester of the invention, as described blow, a process for producing a polyester with removing these aliphatic dicarboxylic acids and acid anhydrides thereof from the reaction system by distillation can be adopted as one embodiment of a preferred process for producing the polyester. In this case, in order to form free aliphatic dicarboxylic acid and/or an acid anhydride thereof, it is advantageous that the terminal is a carboxyl group, so that an aliphatic dicarboxylic acid is preferably used as the above dicarboxylic acid component. Specifically, since an aliphatic dicarboxylic acid having a relatively small molecular weight and/or an acid anhydride thereof can be relatively easily removed by heating under reduced pressure, adipic acid and succinic acid are preferred and particularly succinic acid is preferred.

Moreover, in addition to the above aliphatic dicarboxylic acid or the derivative thereof, an aromatic dicarboxylic acid or a derivative thereof may be used in combination. Specific examples of the aromatic dicarboxylic acid include terephthalic acid, isophthalic acid, naphthalenedicarboxylic acid, diphenyldicarboxylic acid, and the like. As the derivative of the aromatic dicarboxylic acid, there may be mentioned low alkyl esters of the above aromatic dicarboxylic acids, specifically methyl esters, ethyl esters, propyl esters, butyl esters, and the like. These may be used solely or as a mixture of two or more thereof in addition to the above aliphatic carboxylic acids. Of these, as the aromatic dicarboxylic acid, terephthalic acid is preferred and as the derivative of the aromatic dicarboxylic acid, dimethyl terephthalate is preferred.

The amount of these other dicarboxylic acid components to be used is usually 50 mol % or less, preferably 30 mol % or less, more preferably 10 mol % or less in the total amount of the dicarboxylic acids.

(Unit of Organic Acid having pKa Value of 3.7 or Below at 25° C.)

The polyester of the invention essentially contains a unit of an organic acid having a pKa value of 3.7 or below at 25° C. in addition to the above diol unit and dicarboxylic unit. In general, since an aliphatic polyester has a low thermal stability to decrease molecular weight due to thermal degradation during the polymerization reaction, it has been considered that a polyester having a high degree of polymerization and a practically sufficient strength cannot be easily obtained. However, by adding the unit of an organic acid having a pKa value of 3.7 or below at 25° C., an aliphatic polyester having a high degree of polymerization which has been hitherto difficult to produce can be easily obtained with adding substantially no chain extender or aliphatic monooxymonocarboxylic acid component since the polymerization rate is enhanced because of exhibition of activity thereof as an acid catalyst and the thermal stability of the polymer is improved depending on the kind of the organic acid component. Thereby, it becomes possible to provide an aliphatic polyester having a high degree of polymerization having a particularly low harmfulness and excellent in thermal stability and color tone among the aliphatic polyesters having a high degree of polymerization which have been hitherto difficult to produce.

As the organic acid having a pKa value of 3.7 or below at 25° C., there may be, for example, mentioned organic acids described in Kagaku Binran (kiso-hen) p. 1054-1058, Maruzen Publishing (1966) and CRC Handbook of chemistry and Physics, 7th Edition, p. 8-43 to 8-56, CRC Press (1995). Of these, a lower limit of the pKa value is preferably 2.0 or more, more preferably 2.5 or more, particularly preferably 3.1 or more and an upper limit is preferably 3.5 or less. In this regard, there are compound showing two or more pKa values among the organic acids. In the invention, the pKa value of the compounds in that case is the lowest pKa value. When an organic acid having a pKa value exceeding 3.7 is used at the polymerization, it is difficult to produce a polyester having a high degree of polymerization and practically excellent in tensile strength. To the contrary, when an organic acid having a too low pKa value is used at the polymerization, properties such as thermal stability and hydrolysis resistance of the polyester formed decrease in some cases. Particularly, in the latter case, since the activity thereof as an acid catalyst is too strong, there are cases that thermal degradation is caused at the polymerization and thus a polyester having a high degree of polymerization is not obtained.

The organic acid having a pKa value of 3.7 or below at 25° C. is not particularly limited but is preferably a compound which may be a copolymerizable component of the polyester and a compound having a carboxyl group because an acid concentration in the polyester after production is reduced and thermal stability of the polyester is improved. Among them, because of easy availability and easy production of a polyester having a high degree of polymerization, polybasic oxycarboxylic acids, particularly polybasic aliphatic oxycarboxylic acids are preferred. Specifically, malic acid (pKa=3.5), tartaric acid (pKa=3.0), citric acid (pKa=3.1), maleic acid (pKa=1.9), fumaric acid (pKa=3.0), and mixtures thereof are preferred. The pKa values shown here are values described in Kagaku Binran (kiso-hen) p. 1054-1058, Maruzen Publishing (1966).

Among them, malic acid, citric acid, fumaric acid, and mixtures thereof are preferred, furthermore, malic acid, fumaric acid, and mixtures thereof are preferred, and especially, malic acid is preferred. Particularly, in the case of producing a polyester starting from succinic acid, depending on the processes for producing succinic acid, a minute amount of malic acid is contained in the starting succinic acid in some cases. In such cases, succinic acid containing malic acid is selected and the production of a polyester can be carried out, in combination with diol component(s), using the succinic acid as it is or, if necessary, with adding malic acid. Since the production of the starting succinic acid can be simplified, such a process is the most preferable one.

The content of these organic acids in the polyester is not particularly limited but when it is controlled within a specific range, not only a polyester having a high degree of polymerization is easily obtained with an extremely minute amount of the chain extender or the aliphatic monooxymonocarboxylic acid component which has been hitherto added for obtaining a polyester having a high degree of polymerization or without them but also a polyester excellent in tensile properties of molded film such as improvement of anisotropy in tensile elongation percentage of molded film can be easily obtained.

For example, the case of malic acid which is an organic acid having a pKa value of 3.5 or below at 25° C. is explained as an example in the following. That is, when the content of malic acid is too small, it is difficult to obtain the polyester having a high degree of polymerization and thus it becomes necessary to add the chain extender or the aliphatic monooxymonocarboxylic acid component. To the contrary, when the amount thereof is too large, there arises a risk of gel formation or even when the gel formation is avoided, the resulting polyester not only is poor in thermal stability and hydrolysis resistance, e.g., easy formation of tetrahydrofuran and cyclic oligomers at heating and easy hydrolysis because of a high terminal concentration of the polymer but also tends to exhibit no good properties as a film because of occurrence of anisotropy in tensile elongation percentage of molded film.

For such a reason, the amount of the organic acid having a pKa value of 3.7 or below at 25° C. to be used is usually 0.0001 mol % or more, preferably 0.001 mol % or more, more preferably 0.005 mol % or more, particularly preferably 0.009 mol % or more as a lower limit and usually 0.4 mol % or less, preferably 0.35 mol % or less, more preferably 0.30 mol % or less, particularly preferably 0.25 mol % or less as an upper limit, based on the aliphatic dicarboxylic acid unit.

(Other Copolymerizable Component)

In the invention, copolymerizable component(s) other than the above may be added.

As specific examples of the copolymerizable component, there may be mentioned at least one polyfunctional compound selected from the group consisting of bifunctional oxycarboxylic acids, polyhydric alcohols having three or more hydroxyl groups and polybasic carboxylic acids having three or more carboxyl groups and anhydrides thereof for forming a crosslinked structure.

Specifically, as the bifunctional oxy carboxylic acids, there may be mentioned lactic acid, glycolic acid, hydroxybutyric acid, hydroxycaproic acid, 2-hydroxy-3,3-dimethylbutyric acid, 2-hydroxy-3-methylbutyric acid, 2-hydroxyisocaproic acid, and the like and they may be derivatives thereof, such as esters or lactones of the oxycarboxylic acids, or polymers of the oxycarboxylic acids. Moreover, these oxycarboxylic acids may be used solely or as mixtures of two or more thereof. In the case that optical isomers are present, they may be any of D-form, L-form, or racemic-form and they may be solids, liquids, or aqueous solutions. Of these, easily available lactic acid or glycolic acid is especially preferred. However, since polyesters produced in the case of using these bifunctional oxycarboxylic acids as copolymerizable components are sometimes apt to be colored or be thermally degraded through cyclization of the oxycarboxylic acid part at heating depending on the amount to be used, the amount of the oxycarboxylic acid to be used is usually less than 0.02 mol %, preferably 0.01 mol % or less, based on the whole monomer units constituting the polyester.

As the polyhydric alcohols having three or more hydroxyl groups, there may be specifically mentioned glycerin, trimethylolpropane, pentaerythritol, and the like and they may be used solely or as mixtures of two or more thereof.

As the polybasic carboxylic acids having three or more carboxyl groups or anhydrides thereof, there may be specifically mentioned propanetricarboxylic acid, pyromellitic anhydride, benzophenonetetracarboxylic anhydride, cyclopentatetracarboxylic anhydride, and the like and they may be used solely or as mixtures of two or more thereof.

The amount of the above compounds having three or more functional groups to be used is usually 5 mol % or less, preferably 1 mol % or less, more preferably 0.1 mol % or less, based on the whole monomer units constituting the polyester since the compounds may cause gel formation.

(Chain Extender)

The aliphatic polyester of the invention may contain a chain extender such as a carbonate compound or a diisocyanate compound but the amount is less than 1 mol %, preferably 0.5 mol % or less, more preferably 0.1 mol % or less in the case of a carbonate bond, and is less than 0.06 mol %, preferably 0.01 mol % or less, more preferably 0.001 mol % or less in the case of a urethane bond, based on the whole monomer units constituting the polyester.

From the viewpoint of using the polyester of the invention as a biodegradable resin, a diisocyante has a problem that a strongly toxic diamine is formed in the progress of its degradation and may be accumulated in the soil. Also, a diphenyl carbonate-based compound generally used as a carbonate compound has a problem that highly toxic bi-product phenol and unreacted diphenyl carbonate may remain in the polyester.

As the carbonate compound, there may be specifically exemplified diphenyl carbonate, ditolyl carbonate, bis(chlorophenyl) carbonate, m-cresyl carbonate, dinaphthyl carbonate, dimethyl carbonate, diethyl carbonate, dibutyl carbonate, ethylene carbonate, diamyl carbonate, dicyclohexyl carbonate, and the like. In addition, there can be used carbonate compounds made of the same or different hydroxy compounds, which are derived from hydroxy compounds such as phenols and alcohols.

As the diisocyanate compound, there may be specifically exemplified known diisocyanate such as 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate, and isophorone diisocyanate and the like.

Moreover, as the other chain extenders, dioxazoline, silicate esters, and the like may be used. As the silicate esters, there may be specifically exemplified tetramethoxysilane, dimethoxydiphenylsilane, dimethoxydimethylsilane, diphenyldihydroxysilane, and the like.

With regard to the silicate esters, the amount thereof to be used is not particularly limited from the viewpoint of environmental protection and safety but the lesser amount thereof is preferred in some cases since operations become complex or the esters may influence the polymerization rate. Therefore, the content thereof is preferably 0.1 mol % or less, more preferably $10^{-5}$ mol % or less.

In the invention, the polyester containing substantially no chain extender is most preferred. However, in order to increase melt tension, a small amount of a peroxide may be added as far as a compound having a low toxicity is added.

(Process for Producing Aliphatic Polyester)

As the process for producing the aliphatic polyester in the invention, conventionally known processes may be used. For example, the polyester can be produced by a general process, e.g., a melt polymerization wherein a polycondensation reaction is carried out under reduced pressure after an esterification reaction and/or an ester exchange reaction between the above aliphatic dicarboxylic acid component and the diol component, or a known thermal dehydrative condensation process in a solution using an organic solvent. A process for producing the polyester by melt polymerization without solvent is preferred in view of economical efficiency and simplicity of production step.

Moreover, the polycondensation reaction is preferably carried out in the presence of a polymerization catalyst. The timing of the addition of the polymerization catalyst is not particularly limited as far as the timing is before the polycondensation reaction. Thus, the catalyst may be added at the feed of the starting materials or at the start of pressure reduction.

As the polymerization catalyst, a compound containing at least one of metal elements of the Groups 1 to 14 of the periodic table. As the metal elements, there may be specifically mentioned scandium, yttrium, samarium, titanium, zirconium, vanadium, chromium, molybdenum, tungsten, tin, antimony, cerium, germanium, zinc, cobalt, manganese, iron, aluminum, magnesium, calcium, strontium, sodium, potassium, and the like. Of these, scandium, yttrium, titanium, zirconium, vanadium, molybdenum, tungsten, zinc, iron, and germanium are preferred and particularly, titanium, zirconium, tungsten, iron, and germanium are preferred. Furthermore, in order to diminish the polymer terminal concentration affecting thermal stability of the polymer, among the metals, metal elements of the Group 3 to 6 of the periodic table, which exhibit Lewis acidity, are preferred. Specifically, scandium, titanium, zirconium, vanadium, molybdenum, and tungsten are mentioned and particularly, in view of easy availability, titanium and zirconium are preferred.

In the invention, as the catalyst, there may be preferably used compounds containing an organic group, such as carboxylate salts, alkoxy salts, organic sulfonate salts, or β-diketonate salts containing these metal elements, further, inorganic compounds such as oxides and halides of the above metals, and mixtures thereof.

Furthermore, when a catalyst composed of a known layered silicate salt described in "Nendo Kobutsu Gaku" written by Haruo Shiramizu, Asakura shoten (1995) solely or in combination with the above metal compound is used, the polymerization rate is sometimes enhanced, so that such a catalyst system is also preferably used.

As the layered silicate salt, there may be specifically mentioned kaolin Group such as dickite, nacrite, kaolinite, anorchisite, and metahalloysite, halloysite, serpentine Group such as chrysotile, lizardite, and antigorite, smectite Group such as montmorillonite, sauconite, beidellite, nontronite, saponite, hectorite, and stevensite, vermiculite Group such as vermiculite, mica Group such as mica, illite, sericite, and glauconite, attapulgite, sepiolite, palygorskite, bentonite, pyrophyllite, talc, and chlorite group.

In the invention, the catalyst is preferably liquid at the polymerization or a compound soluble in an ester oligomer or polyester because the polymerization rate is increased when the catalyst is in a melted or dissolved state. Moreover, the polycondensation is preferably carried out without solvent but, aside from this, a small amount of a solvent may be used for dissolving the catalyst.

As the solvent for dissolving the catalyst, there may be mentioned alcohols such as methanol, ethanol, isopropanol, and butanol, the above diols such as ethylene glycol, butanediol, and pentanediol, ethers such as diethyl ether and tetrahydrofuran, nitriles such as acetonitrile, hydrocarbon compounds such as heptane and toluene, water and mixtures thereof. The amount thereof to be used is such an amount that the catalyst concentration may be usually 0.0001% by weight or more and 99% by weight or less.

As the titanium compound, tetraalkyl titanates are preferred. Specifically, there may be mentioned tetra-n-propyl titanate, tetraisopropyl titanate, tetra-n-butyl titanate, tetra-t-butyl titanate, tetraphenyl titanate, tetracyclohexyl titanate, tetrabenzyl titanate, and mixed titanates thereof. In addition, titanium (oxy)acetylacetonate, titanium tetraacetylacetonate, titanium (diisopropoxide) acetylacetonate, titanium bis(ammonium lactate) dihydroxide, titanium bis(ethylacetoacetate) diisopropoxide, titanium (triethanolaminate) isopropoxide, polyhydroxytitanium stearate, titanium lactate, titanium triethanolaminate, butyl titanate dimer, and the like are also preferably used.

Of these, tetra-n-propyl titanate, tetraisopropyl titanate, and tetra-n-butyl titanate, titanium (oxy)acetylacetonate, titanium tetraacetylacetonate, titanium bis(ammonium lactate) dihydroxide, polyhydroxytitanium stearate, titanium lactate, and butyl titanate dimer are preferred, and tetra-n-butyl titanate, titanium (oxy)acetylacetonate, titanium tetraacetylacetonate, polyhydroxytitanium stearate, titanium lactate, and butyl titanate dimer are more preferred. Particularly, tetra-n-butyl titanate, polyhydroxytitanium stearate, titanium (oxy)acetylacetonate, and titanium tetraacetylacetonate are preferred.

As the zirconium compound, there may be specifically exemplified zirconium tetraacetate, zirconium acetate hydroxide, zirconium tris(butoxy) stearate, zirconyl diacetate, zirconium oxalate, zirconyl oxalate, zirconium potassium oxalate, polyhydroxyzirconium stearate, zirconium ethoxide, zirconium tetra-n-propoxide, zirconium tetraisopropoxide, zirconium tetra-n-butoxide, zirconium tetra-t-butoxide, zirconium tributoxy acetylacetonate, and mixtures thereof. Of these, zirconyl diacetate, zirconium tris(butoxy) stearate, zirconium tetraacetate, zirconium acetate hydroxide, zirconium ammonium oxalate, zirconium potassium oxalate, polyhydroxyzirconium stearate, zirconium tetra-n-propoxide, zirconium tetraisopropoxide, zirconium tetra-n-butoxide, and zirconium tetra-t-butoxide are preferred, and zirconyl diacetate, zirconium tetraacetate, zirconium acetate hydroxide, zirconium tris(butoxy) stearate, zirconium ammonium oxalate, zirconium tetra-n-propoxide, and zirconium tetra-n-butoxide are more preferred. Particularly, zirconium tris(butoxy) stearate is preferred because a colorless polyester having a high degree of polymerization is easily obtained.

As the germanium compound, there may be specifically mentioned inorganic germanium compounds such as germanium oxide and germanium chloride and organic germanium compounds such as tetraalkoxygermanium. In view of price and availability, germanium oxide, tetraethoxygermanium, tetrabutoxygermanium, and the like are preferred and particularly, germanium oxide is preferred.

As the other metal-containing compound, there may be mentioned scandium compounds such as scandium carbonate, scandium acetate, scandium chloride, and scandium acetylacetonate, yttrium compounds such as yttrium carbonate, yttrium chloride, yttrium acetate, and yttrium acetylacetonate, vanadium compounds such as vanadium chloride, vanadium oxide trichloride, vanadium acetylacetonate, and vanadium acetylacetonate oxide, molybdenum compounds such as molybdenum chloride and molybdenum acetate, tungsten compounds such as tungsten chloride, tungsten acetate, tungstenic acid, lanthanoid compounds such as cerium chloride, samarium chloride, and ytterbium chloride, and the like.

The amount of the catalyst to be added in the case of using a metal compound as the polymerization catalyst is usually 0.1 ppm or more, preferably 0.5 ppm or more, more preferably 1 ppm or more as a lower limit and is usually 30,000 ppm or less, preferably 1,000 ppm or less, more preferably 250 ppm or less, particularly preferably 130 ppm or less as an upper limit, as a metal amount based on the formed polyester. In particular, when the metal amount in the polyester is 50 ppm or less, more preferably 10 ppm or less, a polyester having a remarkably low terminal concentration of the carboxyl group in the polymer can be produced in some cases, so that the case is preferred.

When the amount of the catalyst used is too large, not only it is disadvantageous in economical efficiency but also, although the reason is yet unclear, the terminal concentration of the carboxyl group in the polymer sometimes increases, so that thermal stability and hydrolysis resistance may be deteriorated by the increase of the terminal amount of the carboxyl group and residual catalyst concentration. To the contrary, when the amount is too small, the polymerization rate decreases and thus thermal degradation of the polymer is induced during the polymer production as the activity decreases, so that the polymer showing practically useful physical properties is difficult to obtain.

On the other hand, from the gist of the invention to provide an aliphatic polyester having a biodegradable function and not harmful to the environment, it is preferred to restrict the amount of a tin-containing compound or an antimony-containing compound since they have particularly a relatively high toxicity among the above polymerization catalysts. Therefore, the amount in the case of using the tin-containing compound or antimony-containing compound as a polymerization catalyst is usually 60 ppm or less, preferably 10 ppm or less, more preferably 1 ppm or less as a metal amount, based on the formed polyester, in the case of a tin compound as a metal amount based on the formed polyester. On the other hand, in the case of an antimony compound, the amount is usually 100 ppm or less, preferably 50 ppm or less, more preferably 10 ppm or less as a metal amount based on the formed polyester.

Moreover, there may be also used a catalyst system using a mineral acid such as hydrochloric acid or sulfuric acid or a salt thereof, a sulfate ester such as dimethyl sulfate, diethyl sulfate, or ethyl sulfate, an organic sulfonic acid such as methanesulfonic acid, trifluoromethanesulfonic acid, or p-toluenesulfonic acid, an inorganic phosphoric acid such as phosphoric acid, hypophosphorous acid, pyrophosphorous acid, phosphorous acid, hypophosphoric acid, pyrophosphoric acid, triphosphoric acid, metaphosphoric acid, peroxophosphoric acid, or polyphosphoric acid, an inorganic hydrogen phosphate salt such as ammonium hydrogen phosphate, magnesium hydrogen phosphate, calcium hydrogen phosphate, ammonium hydrogen polyphosphate, magnesium hydrogen polyphosphate, or calcium hydrogen polyphosphate, an organic phosphinic acid such as phenylphosphinic acid, benzylphosphinic acid, methylphosphinic acid, n-butylphsophinic acid, cyclohexylphosphinic acid, or diphenylphosphinic acid, and an organic phosphonic acid such as phenylphosphonic acid, benzylphosphonic acid, methylphosphonic acid, n-butylphosphonic acid, or cyclophosphonic acid as a co-catalyst.

However, these acidic compounds releasing protons generally not only generate, for example, a by-product such as tetrahydrofuran from starting butanediol (Encyclopaedia Chimica, vol. 7, p. 850, Kyoritsu Shuppan (1962)) but also possibly deteriorate thermal stability and hydrolysis resistance of the polyester owing to an increased acid concentration of the final product, so that its use is not preferred. Therefore, the content of these acidic compounds releasing protons in the polyester is not particularly limited but the range of usually $10^{-5}$ mol % or less, preferably $10^{-8}$ mol % or less, particularly preferably $10^{-9}$ mol % or less is a preferred range. However, the polyester containing substantially no such compounds is most preferred.

Moreover, among these acidic compounds, particularly in the case of using an organic phosphinic acid and/or organic phosphonic acid as a co-catalyst, since these compounds are apt to form adducts with a polymerization catalyst and thus tend to inhibit a Lewis acid point as a reactive active point of the catalyst in addition to the above disadvantages of the acidic compounds, the catalytic reaction is retarded and, as a result, the polyester having a high degree of polymerization is not obtained in some cases. Moreover, in the case of using a hydrogen phosphate salt as a co-catalyst, the salt not only has the same disadvantages as an acidic compound but also counter cations of the hydrogen phosphate salt remains in the polymer after the polymerization reaction unlike an acid such as phosphoric acid and hence these remaining cations act as a Lewis acid to deteriorate hydrolysis resistance of the polyester in some cases. Therefore, in the polyester of the invention, an upper limit of the content of the phosphorus atom in the polyester derived from the phsophorus-containing compound selected from the organic phosphinic acids, organic phosphonic acids, and hydrogen phosphate salts is necessarily less than 10-9 mol %, preferably $10^{-10}$ mol % or less, based on the whole component units constituting the polyester but the polyester containing substantially no such acids is most preferred.

Hitherto known ranges can be adopted as conditions for temperature, time, pressure, and the like.

The reaction temperature for the esterification reaction and/or ester-exchange reaction of the dicarboxylic acid component(s) and the diol component(s) is usually 150° C. or higher, preferably 180° C. or higher as a lower limit and usually 260° C. or lower, preferably 250° C. or lower as an upper limit. The reaction atmosphere is usually an atmosphere of an inert gas such as nitrogen or argon. The reaction pressure is usually normal pressure to 10 kPa but normal pressure is preferred.

The reaction time is usually 1 hour or more, and an upper limit is usually 10 hour or less, preferably 4 hour or less.

The subsequent polycondensation reaction is carried out under a pressure, i.e., a degree of vacuum, of usually $0.01 \times 10^3$ Pa or higher, preferably $0.03 \times 10^3$ Pa or higher as a lower limit and usually $1.4 \times 10^3$ Pa or lower, preferably $0.4 \times 10^3$ Pa or lower. When the pressure at the production by polymerization is too high, the production of the polyester by polymerization takes longer time and decrease in molecular weight and coloration due to thermal degradation of the polyester are caused along with the longer production time and hence there is a tendency that the polyester showing practically sufficient properties is difficult to produce. On the other hand, a process for producing the same using an ultrahigh vacuum polymerization facility is a preferred embodiment in view of enhancing the polymerization rate but the process is economically disadvantageous since extremely large investment in facilities is necessary.

The reaction temperature at this occasion is in the range of usually 150° C. or higher, preferably 180° C. or higher as a lower limit and usually 260° C. or lower, preferably 250° C. or lower as an upper limit. When the temperature is too low, the polymerization rate is low and the production of the polyester having a high degree of polymerization not only requires a long period of time but also necessitates a high-power stirring machine, so that the case is economically disadvantageous. On the other hand, when the reaction temperature is too high, thermal degradation of the polymer at the production is caused and there is a tendency that the polyester having a high degree of polymerization is difficult to produce.

The reaction time is usually 2 hours or more as a lower limit and usually 15 hours or less, preferably 8 hours or less, more preferably 6 hours or less as an upper limit. When the reaction time is too short, the reaction proceeds insufficiently to obtain the polyester having a low degree of polymerization which is low in tensile elongation percentage at break. Moreover, the terminal amount of the carboxyl group in the polymer is sometimes large and deterioration of the tensile elongation percentage at break is remarkable in many cases as mentioned below. On the other hand, when the reaction time is too long, decrease in molecular weight by thermal degradation of the polyester becomes remarkable and not only the tensile elongation percentage at break is deteriorated but also the terminal amount of the carboxyl group, which affects durability of the polymer, increases through thermal degradation in some cases.

In the invention, in the case that an aromatic dicarboxylic acid or its alkyl ester is used as a dicarboxylic acid component in combination with the aliphatic carboxylic acid, the order of the addition is not particularly limited and various methods can be adopted, for example, as a first method, starting monomers can be charged at once into a reaction vessel and reacted or, as a second method, a method of subjecting diol component(s) and aliphatic dicarboxylic acid(s) or derivative(s) thereof to an esterification reaction or an ester-exchange reaction, then subjecting diol component(s) and aromatic dicarboxylic acid(s) or derivative(s) thereof to an esterification reaction or an ester-exchange reaction, and further subjecting the product to a polycondensation reaction.

In the invention, as a reaction apparatus for producing the polyester, known vertical or horizontal stirring vessel-type reactors can be used. For example, there may be mentioned a method wherein the melt polymerization is carried out using the same or different reaction apparatus in two stages composed of a step of esterification and/or ester exchange reaction and a step of polycondensation under reduced pressure and a stirring vessel-type reactor fitted with an exhaust tube for pressure reduction connecting a vacuum pump and the reactor is used as a reactor for polycondensation under reduced pressure. Moreover, there is preferably used a method wherein a condenser is connected in the middle of the exhaust tube for reduced pressure connecting the vacuum pump and the reactor and volatile components formed during the polycondensation reaction and unreacted monomers are recovered in the condenser.

In the invention, as processes for producing the polyester, there is used a process of carrying out an esterification reaction and/or an ester exchange reaction between dicarboxylic acid component(s) including the above aliphatic dicarboxylic acid(s) and aliphatic diol component(s) and then increasing the degree of polymerization by removing diol(s) formed through the ester exchange reaction by distillation or a process of increasing the degree of polymerization of the polyester with removing aliphatic dicarboxylic acid(s) and/or acid anhydride(s) thereof from the aliphatic carboxyl terminal of the polyester by distillation. In the invention, though the polyester having a high degree of polymerization can be produced using a compound containing a metal element of the Groups 3 to 6 of the periodic table as a catalyst even by the former process, the latter process of removing the aliphatic dicarboxylic acid(s) and/or acid anhydride(s) thereof by distillation is preferred because the polyester having a high degree of polymerization is easily obtained within a relatively short period of time without using any chain extender or the like. In this case, for the removal of the aliphatic dicarboxylic acid(s) and/or acid anhydride(s) thereof, there is adopted a method of distilling out the aliphatic dicarboxylic acid(s) and/or acid anhydride(s) thereof under heating during the polycondensation reaction under reduced pressure at later stage of the above melt polymerization step but, since the aliphatic dicarboxylic acid(s) are easily converted into acid anhydride(s) under the polycondensation reaction conditions, the acid(s) are distilled out under heating in the form of the acid anhydride(s) in many cases. Moreover, at that time, linear or cyclic ether(s) and/or diol(s) derived from the diol may be also removed together with the aliphatic dicarboxylic acid(s) and/or acid anhydride(s) thereof. Furthermore, the method of removing the cyclic monomer(s) of the dicarboxylic acid component and the diol component concurrently by distillation is a preferred embodiment because the polymerization rate increases.

In the case of producing the polyester using the process of removing the aliphatic dicarboxylic acid(s) and/or acid anhydride(s) thereof by distillation, when the amount of the aliphatic dicarboxylic acid(s) and/or acid anhydride(s), which is not particularly limited, is usually 30 mol % or more, preferably 50 mol % or more, more preferably 70 mol % or more, further preferably 80 mol % or more, most preferably 90 mol % or more based on the total amount of the aliphatic dicarboxylic acid(s) and/or acid anhydride(s) and the diol to be removed by distillation, the polyester having a high degree of polymerization can be easily produced. Particularly, in the case of a typical element such as germanium, the tendency is remarkable.

In the invention, in the case of producing the polyester having a high degree of polymerization by the process of removing the aliphatic dicarboxylic acid(s) and/or acid anhydride(s) thereof by distillation, when the temperature at the outlet at the reaction vessel side of the exhaust tube for reduced pressure connecting the vacuum pump and the reactor is maintained at a temperature equal to or higher than an either lower temperature of the melting point of the aliphatic dicarboxylic anhydride or the boiling point of the aliphatic dicarboxylic anhydride at the degree of vacuum at the polycondensation reaction, the acid anhydride formed can be effectively removed from the reaction system and the aimed polyester having a high degree of polymerization can be produced for a short period of time, so that the case is preferred. Furthermore, it is more preferred to maintain the temperature of the exhaust tube from the outlet at the reaction vessel side to the condenser at a temperature equal to or higher than an either lower temperature of the melting point of the anhydride or the boiling point of the anhydride at the degree of vacuum at the polycondensation reaction.

In the invention, a preferable range of the molar ratio of the diol component to the dicarboxylic acid component for obtaining the polyester having an aimed degree of polymerization varies depending on the purpose thereof and the kinds of the starting materials but the amount of the diol component relative to 1 mol of the acid component is usually 0.8 mol or more, preferably 0.9 mol or more as a lower limit and usually 1.5 mol or less, preferably 1.3 mol or less, particularly preferably 1.2 mol or less.

Furthermore, in the case of producing the polyester having a high degree of polymerization by removing the aliphatic dicarboxylic acid(s) and/or acid anhydride(s) thereof by distillation, it is not necessary to use more excessive diol as a starting material as is used in conventional processes since a larger terminal amount of the carboxylic acid is advantageous for the polymerization. In this case, a preferable range of the molar ratio of the diol component to the dicarboxylic acid component also varies depending on the aimed degree of polymerization and kind of the polyester but the amount of the diol component relative to 1 mol of the acid component is usually 0.8 mol or more, preferably 0.9 mol or more, more preferably 0.95 or more as a lower limit and usually 1.15 mol or less, preferably 1.1 mol or less, particularly preferably 1.07 mol or less as an upper limit.

On the other hand, when the process for producing the polyester by removing the aliphatic dicarboxylic acid(s) and/or acid anhydride(s) thereof by distillation is used, the polyester produced has a large terminal amount of the carboxylic acid in the case of a low degree of polymerization as compared with the cases of conventional processes. Moreover, by lowering the feed ratio of diol/dicarboxylic acid, the tendency becomes remarkable. The polyester obtained by such a procedure is finally converted into a polyester having a low amount of the terminal carboxylic acid and excellent in thermal stability and hydrolysis resistance by enhancing reduced viscosity ($\eta sp/C$) but it is possible to control the terminal amount of the carboxyl group in the polyester produced by regulating the above feed ratio. Thereby, it becomes also possible to control hydrolysis resistance and biodegradability of the polyester.

(Aliphatic Polyester and Application Thereof)

The reduced viscosity ($\eta sp/C$) value of the aliphatic polyester produced in the invention is 1.6 or more because practically sufficient mechanical properties are obtained. Particularly, 2.0 or more is preferred and furthermore 2.2 or more, particularly 2.3 or more is preferred. An upper limit of the reduced viscosity ($\eta sp/C$) value is usually 6.0 or less, preferably 5.0 or less, further preferably 4.0 or less in view of operability such as removability and moldability of the polyester after the polymerization reaction. The factor is a factor also affecting the terminal concentration of the carboxyl group in the polyester but, by increasing the viscosity of the polymer, hydrophobicity is increased and thus hydrolysis resistance is enhanced in some cases. In this regard, the reduced viscosity in the invention is measured under the following conditions.

[Measuring Conditions for Reduced Viscosity ($\eta sp/C$)]

Viscosity tube: Ubbelohde's viscosity tube

Measuring temperature: 30° C.

Solvent: phenol/tetrachloroethane (1:1 weight ratio) solution

Polyester concentration: 0.5 g/dl

With regard to the polyester having a reduced viscosity of 1.6 or more, even when the polyester is produced by the process of removing the aliphatic dicarboxylic acid(s) and/or acid anhydride(s) thereof by distillation, the number of the terminal COOH groups in the resulting polyester becomes 50 eq/ton or less and thus the polyester becomes a polyester excellent in thermal stability. The number of the terminal COOH groups in the polyester of the invention is usually 50 eq/ton or less, preferably 35 eq/ton or less, more preferably 25 eq/ton or less. Such a polyester has characteristics that thermal stability is excellent and the quality is less deteriorated during molding, that is, little side reactions such as cleavage of the terminal group and cleavage of the main chain occur during melt molding.

On the other hand, in view of practical durability, the aliphatic polyester of the invention preferably has a retention rate of the reduced viscosity of 80% or more when the aliphatic polyester is transformed into a film-shape test piece having a thickness of 150±25 μm and the test piece is kept under conditions of a temperature of 50° C. and a relative humidity of 90% R.H. for 28 days. The retention rate of the reduced viscosity means (reduced viscosity after the retention test/reduced viscosity before the retention test)×100 (%). Preferable retention rate of the reduced viscosity is 80% or more, more preferably 85% or more, further preferably 90% or more.

The aliphatic polyester having such characteristics shows an excellent durability that a retention rate of tensile elongation percentage at break before and after the retention test (=(tensile elongation percentage at break after test/tensile elongation percentage at break before test)×100 (%)) is usually 50% or more, preferably 75% or more. Namely, it has been found during the process for accomplishing the invention that the degree of deterioration of the tensile elongation percentage at break is determined by not a value of reduced viscosity of the aliphatic polyester after use or after storage but a change rate of the reduced viscosity at use or at storage. Since the aliphatic polyester having such characteristics is a resin which is excellent in practical mechanical properties in addition to the tensile elongation percentage at break and also which exhibits small degree of deterioration thereof, the polyester is a suitable resin for long-term use or storage as molded products, and is a particularly useful resin for a film material for the purpose of long-term use.

Such an aliphatic polyester is considered to exhibit durability such as hydrolysis resistance by combination of some factors such as the terminal amount of the carboxyl group, the ratio of terminal carboxyl group/terminal hydroxyl, the reduced viscosity, and the metal content of the catalyst in the polyester, although the detail is not clear.

First, one factor is the terminal concentration of the carboxyl group which is considered to remarkably affect thermal stability of the polyester. In the process of accomplishing the invention, in the case of the aliphatic polyester, it has been clarified that there is observed an indication that the tensile properties represented by hydrolysis resistance at relatively long-term use and storage are less deteriorated as the terminal concentration of the carboxyl group decreases and when the amount is reduced to a specific concentration or less, the retention rate of the tensile properties is extremely improved. In order to remarkably enhance the durability of the tensile elongation percentage at break, the terminal concentration of the carboxyl group is usually 10 eq/ton or less, further 6 eq/ton or less, particularly 4 eq/ton or less.

On the other hand, for the production of the polyester in which terminal carboxyl group is substantially not present, since the polymerization rate is extremely low and investment for highly expensive ultrahigh vacuum facilities is required in the conventional production process, it becomes necessary to use an isocyanate or carbonate compound as an economically advantageous procedure. To the contrary, when the terminal carboxyl group is present in the polyester and/or oligoester formed, the polymerization rate is high and the polyester having a high degree of polymerization is easily obtained. For the reasons, it is important that the terminal carboxyl group is present in the aliphatic polyester of the invention in a concentration of usually 0.1 eq/ton or more, preferably 0.5 eq/ton or more, particularly 1 eq/ton or more.

The terminal concentration can be controlled by regulating feed balance of the dicarboxylic acid/diol at the above production. Moreover, as an alternative for controlling the terminal concentration, there is preferably used a method of controlling the concentration by incorporating into the polymerization system an appropriate amount of at least one compound unit having three or more functional groups selected from the group consisting of polyhydric alcohols having three or more hydroxyl groups, polybasic carboxylic acids having three or more carboxylic groups, and oxycarboxylic acids having three or more functional groups, such as pentaerythritol, pyromellitic acid, malic acid, tartaric acid, and citric acid.

By suitably regulating the balance of the dicarboxylic acid/diol at the above production, the kinds and amounts of the compounds having three or more functional groups, the upper limit of the amount ratio of terminal carboxyl group/terminal hydroxyl group in the polyester can be regulated to usually 0.20 or less, preferably 0.15 or less, more preferably 0.10 or less and the lower limit can be regulated to usually 0.001 or more, preferably 0.01 or more, more preferably 0.02 or more.

In the polymerization system where the terminal amount ratio is too low, since the production of the polyester by polymerization takes a longer period of time and a decrease in molecular weight and coloration due to thermal degradation of the polyester are caused, extremely expensive investment in facilities is necessary for production of the polyester showing practically sufficient properties. On the other hand, in the polymerization system where the amount ratio is too large, a polyester having a low hydrolysis resistance is produced at the production of the polyester which is suitable in operability such as removability or moldability after the polymerization reaction, but at the production of a polyester having an increased hydrolysis resistance, the viscosity of the resulting polyester is too high to tend to induce adverse effects in operability such as removability or moldability after the polymerization reaction.

The metal amount of the catalyst contained in the aliphatic polyester of the invention depends on the metal species of the catalyst used but the smaller amount thereof may not only reduce possibility of hydrolysis and thermal degradation of the polyester but also enables production of a polymer having a low terminal concentration of the carboxyl group in the polymer in many cases. For example, when the titanium amount contained in the aliphatic polyester produced in the case of using a titanium-containing catalyst as a catalyst is regarded to be 10 ppm or less, a polyester showing an excellent durability where the above terminal number of the carboxyl groups is 10 eq/ton or less can be easily produced, the reason being not yet clear.

During the production process of the invention or to the polyester obtained, various additives, for example, a heat stabilizer, an antioxidant, a crystal nucleating agent, a flame retardant, an antistatic agent, a release agent, a UV absorber, and the like may be added at the time of polymerization within a range not impairing the properties.

Moreover, at the time of molding, in addition to the above various additives, a reinforcing agent and a filler, such as glass fiber, carbon fiber, titanium whisker, mica, talc, $CaCO_3$, $TiO_2$, or silica may be added and then molding can be effected.

Since the polyester obtained by the production process of the invention is excellent in thermal resistance and color tone, further excellent in hydrolysis resistance and biodegradability, and also can be produced inexpensively, it is suitable for applications of various films and applications of injection-molded articles.

Specific applications include injection-molded articles (e.g., trays for fresh foods, containers for fast foods, products for outdoor leisure, etc.), extrusion-molded articles (films, sheets, and the like, e.g., fishing lines, fishing nets, vegetation nets, water-holding sheets, etc.), blow molded articles (bottles, etc.), and the like. In addition, the polyester can be utilized for agricultural films, coating materials, coating materials for fertilizer, laminate films, plates, drawn sheets, monofilaments, multifilaments, nonwoven fabrics, flat yarn, staple, crimped staple, striped tapes, split yarn, compound fibers, blow bottles, foams, shopping bags, garbage bags, compost bags, containers for cosmetics, containers for detergent, containers for bleach, ropes, lashings, surgical strings, sanitary cover stock materials, cold boxes, cushioning films, synthetic papers, and the like.

EXAMPLES

The following will describe the invention further in detail with reference to Examples but the invention is not limited to the following Examples unless it exceeds the gist.

(Amount of Terminal Carboxyl Group)

It is a value obtained by dissolving the obtained polyester in benzyl alcohol and titrating it with 0.1N NaOH and is an equivalent amount of the carboxyl group per $1 \times 10^6$ g of polyester.

(Amount of Terminal OH Group)

It is a value determined on $^1$H-NMR and is an equivalent amount of the OH group per $1 \times 10^6$ g of polyester.

Example 1

Production of Polyester Having Malic Acid Content of 0.33 mol % Relative to Aliphatic Dicarboxylic Acid

Example 1-A

To a reaction vessel equipped with a stirring apparatus, a nitrogen inlet, a heating apparatus, a thermometer, and an outlet for pressure reduction were fed 100.3 g (0.85 mol) of succinic acid, 78.8 g (0.87 mol) of 1,4-butanediol, and 1.34 g ($2.8 \times 10^{-3}$ mol, 0.33 mol % relative to succinic acid) of 27.7% by weight of an aqueous malic acid solution in which germanium dioxide as a catalyst had been dissolved in an amount of 4% by weight beforehand, and the inner system was made a nitrogen atmosphere by replacement with nitrogen under reduced pressure.

Then, the inner system was heated to 220° C. under stirring and they were reacted at this temperature for 1 hour. Thereafter, the temperature was elevated to 230° C. and, at the same time, the pressure was reduced to $0.07 \times 10^3$ Pa over a period of 1 hour 30 minutes. Furthermore, 2.5 hours of the reaction was carried out under reduced pressure of $0.07 \times 10^3$ Pa to obtain a white polyester. During the polycondensation reaction under reduced pressure, the outlet for pressure reduction of the reaction vessel was continued to heat at 110° C.

The reduced viscosity ($\eta sp/C$) of the resulting polyester was 2.4, the amount of the terminal carboxyl group was 18 eq/ton, the amount of the terminal OH group was 44 eq/ton, and the contents of a carbonate bond, a urethane bond, an aliphatic monooxymonocarboxylic acid unit, and a phosphorus atom derived from a phosphorus-containing compound were each 0. Main volatile components distilled out from the outlet for pressure reduction during the polymerization were succinic anhydride (3.8 g), a mixed solution (32 g) of water and tetrahydrofuran, and a small amount of 1,4-butanediol.

Example 1-B

A polyester was obtained under the same polycondensation reaction conditions as in Example 1-A except that, as the feed of starting materials, 0.33% by weight aqueous germanium dioxide solution (15.15 g) was fed to a mixture of 100.3 g (0.85 mol) of succinic acid, 78.8 g (0.87 mol) of 1,4-butanediol, and 0.37 g ($2.8 \times 10^{-3}$ mol, 0.33 mol % relative to succinic acid) of malic acid. The polymerization reaction time under reduced pressure of $0.07 \times 10^3$ Pa was 3 hours.

The reduced viscosity ($\eta sp/C$) of the resulting polyester was 2.3, the amount of the terminal OH group was 60 eq/ton, and the contents of a carbonate bond, a urethane bond, an aliphatic monooxymonocarboxylic acid unit, and a phosphorus atom derived from a phosphorus-containing compound were each 0. Main volatile components distilled out from the outlet for pressure reduction during the polymerization were succinic anhydride (3.6 g), a mixed solution (45 g) of water and tetrahydrofuran, and a small amount of 1,4-butanediol.

Example 1-C

To a reaction vessel equipped with a stirring apparatus, a nitrogen inlet, a heating apparatus, a thermometer, and an outlet for pressure reduction were fed 100.3 g (0.85 mol) of succinic acid, 80.35 g (0.89 mol) of 1,4-butanediol, and 0.37 g ($2.8 \times 10^{-3}$ mol, 0.33 mol % relative to succinic acid) of malic acid, and the inner system was made a nitrogen atmosphere by replacement with nitrogen under reduced pressure.

Then, the inner system was heated to 220° C. under stirring and they were reacted at this temperature for 1 hour. Thereafter, a catalyst solution obtained by diluting 0.107 g of tetra-n-butyl titanate with 0.4 g of butanol was added to the reaction system and then the temperature was elevated to 230° C. over a period of 30 minutes and, at the same time, the pressure was reduced to $0.07 \times 10^3$ Pa over a period of 1 hour 30 minutes. Furthermore, 3.5 hours of the reaction was carried out under reduced pressure of $0.07 \times 10^3$ Pa to obtain a polyester.

The reduced viscosity ($\eta sp/C$) of the resulting polyester was 2.4, the amount of the terminal carboxyl group was 16 eq/ton, the amount of the terminal OH group was 55 eq/ton, and the contents of a carbonate bond, a urethane bond, an aliphatic monooxymonocarboxylic acid unit, and a phosphorus atom derived from a phosphorus-containing compound were each 0.

Main volatile components distilled out from the outlet for pressure reduction during the polymerization were water, succinic anhydride, tetrahydrofuran, a cyclic monomer of succinic acid and butanediol, and a small amount of 1,4-butanediol.

Example 1-D

A polyester was obtained under the same polycondensation reaction conditions as in Example 1-C except that 100.3 g (0.85 mol) of succinic acid, 81.12 g (0.90 mol) of 1,4-butanediol, and 0.37 g ($2.8 \times 10^{-3}$ mol, 0.33 mol % relative to succinic acid) of malic acid were used as starting materials and a catalyst solution obtained by diluting 0.107 g of tetra-n-butyl titanate with 3.1 g of 1,4-butanediol was used as a catalyst. The polymerization reaction time under reduced pressure of $0.07 \times 10^3$ Pa was 7 hours.

The reduced viscosity ($\eta sp/C$) of the resulting polyester was 2.4, the amount of the terminal carboxyl group was 23 eq/ton, the amount of the terminal OH group was 63 eq/ton, and the contents of a carbonate bond, a urethane bond, an aliphatic monooxymonocarboxylic acid unit, and a phosphorus atom derived from a phosphorus-containing compound were each 0.

Main volatile components distilled out from the outlet for pressure reduction during the polymerization were water, tetrahydrofuran, a cyclic monomer of succinic acid and butanediol, and tetrahydrofuran.

Example 1-E

To a reaction vessel equipped with a stirring apparatus, a nitrogen inlet, a heating apparatus, a thermometer, and an outlet for pressure reduction were fed 100.3 g (0.85 mol) of succinic acid, 81.1 g (0.90 mol) of 1,4-butanediol, and 0.37 g ($2.8 \times 10^{-3}$ mol, 0.33 mol % relative to succinic acid) of malic acid, and the inner system was made a nitrogen atmosphere by replacement with nitrogen under reduced pressure.

Then, the inner system was heated to 220° C. under stirring and they were reacted at this temperature for 1 hour. Thereafter, 0.36 g of Orgatix ZB-320 (zirconium tributoxystearate, manufactured by Matsumoto Trading Co., Ltd.) was added to the reaction system, then the temperature was elevated to 230° C. over a period of 30 minutes and, at the same time, the pressure was reduced to $0.07 \times 10^3$ Pa over a period of 1 hour 30 minutes. Furthermore, 4 hours of the reaction was carried out under reduced pressure of $0.07 \times 10^3$ Pa to obtain a polyester.

The reduced viscosity ($\eta sp/C$) of the resulting polyester was 2.6, the amount of the terminal carboxyl group was 19 eq/ton, the amount of the terminal OH group was 43 eq/ton, and the contents of a carbonate bond, a urethane bond, an aliphatic monooxymonocarboxylic acid unit, and a phosphorus atom derived from a phosphorus-containing compound were each 0.

Main volatile components distilled out from the outlet for pressure reduction during the polymerization were water, succinic anhydride, tetrahydrofuran, a cyclic monomer of succinic acid and butanediol, and a small amount of 1,4-butanediol.

Example 1-F

The same operations as in Example 1-A were conducted except that the charged amounts were changed to 3420 g (29.0 mol) of succinic acid, 2689 g (29.8 mol) of 1,4-butanediol, and 45.6 g ($9.4 \times 10^{-2}$ mol) of 27.7% by weight of an aqueous malic acid solution in which germanium dioxide had been dissolved in an amount of 4% by weight beforehand.

The reduced viscosity ($\eta sp/C$) of the resulting polyester was 2.4, the amount of the terminal carboxyl group was 29 eq/ton, the amount of the terminal OH group was 39 eq/ton, and the contents of a carbonate bond, a urethane bond, an aliphatic monooxymonocarboxylic acid unit, and a phosphorus atom derived from a phosphorus-containing compound were each 0.

The resulting polymer was melted at 150° C. for 3 minutes and further pressed at 150° C. under 20 MPa for 2 minutes using a bench-type press machine to obtain a film having a thickness of about 150 μm. As a result of measurement of tensile elongation percentage at break using a test piece punched from the resulting film into a dumbbell shape (length 10 cm) (speed of drawing=200 mm/min, distance between marks=10 mm, distance between chucks=60 mm), the tensile elongation percentage was 400%.

Moreover, alternatively, the resulting pellets were extruded at 160° C. from a cylindrical die having a diameter of 75 mm to obtain a film having a thickness of 50 μm. As a result of carrying out the test of tensile elongation at break on the resulting film, the tensile elongation percentages at break in the MD and TD directions were 390% and 60%, respectively, and thus anisotropy was observed in the tensile elongation of the film.

Example 1-G

The same operations as in Example 1-A were conducted except that the charged amounts were changed to 68.8 g (0.58 mol) of succinic acid, 36.6 g (0.25 mol) of adipic acid, 77.3 g (0.86 mol) of 1,4-butanediol, and 1.3 g ($2.7 \times 10^{-3}$ mol) of 27.7% by weight of an aqueous malic acid solution in which germanium dioxide as a catalyst had been dissolved in an amount of 4% by weight beforehand. The polymerization reaction time under reduced pressure of $0.07 \times 10^3$ Pa was 4.5 hours.

The reduced viscosity ($\eta sp/C$) of the resulting polyester was 2.4, the amount of the terminal carboxyl group was 23 eq/ton, the amount of the terminal OH group was 55 eq/ton, and the contents of a carbonate bond, a urethane bond, an aliphatic monooxymonocarboxylic acid unit, and a phosphorus atom derived from a phosphorus-containing compound were each 0.

Example 1-H

The same operations as in Example 1-A were conducted except that the charged amounts were changed to 2662 g (22.5 mol) of succinic acid, 825 g (5.7 mol) of adipic acid, 2608 g (28.9 mol) of 1,4-butanediol, and 43.3 g ($9.2 \times 10^{-2}$ mol) of 27.7% by weight of an aqueous malic acid solution in which germanium dioxide as a catalyst had been dissolved in an amount of 4% by weight beforehand. The polymerization reaction time under reduced pressure of $0.07 \times 10^3$ Pa was 5 hours.

The reduced viscosity ($\eta sp/C$) of the resulting polyester was 2.8, the amount of the terminal carboxyl group was 35 eq/ton, the amount of the terminal OH group was 37 eq/ton, and the contents of a carbonate bond, a urethane bond, an aliphatic monooxymonocarboxylic acid unit, and a phosphorus atom derived from a phosphorus-containing compound were each 0.

The resulting pellets were extruded at 160° C. from a cylindrical die having a diameter of 75 mm to obtain a film having a thickness of 50 μm. As a result of carrying out the test of tensile elongation at break on the resulting film, the tensile elongation percentages at break in the MD and TD directions were both 700%.

Example 2

Production of Polyester Having Malic Acid Content of 0.16 mol % Relative to Succinic Acid

Example 2-A

A polyester having a reduced viscosity ($\eta sp/C$) of 2.2 was obtained under the same polycondensation conditions as in Example 1-A except that, as the feed of starting materials, 0.65 g ($1.3 \times 10^{-3}$ mol, 0.16 mol % relative to succinic acid) of 27.7% by weight of an aqueous malic acid solution in which germanium dioxide had been dissolved in an amount of 4% by weight beforehand was fed to a mixture of 100.3 g (0.85 mol) of succinic acid and 78.8 g (0.87 mol) of 1,4-butanediol. The polymerization reaction time under reduced pressure of $0.07 \times 10^3$ Pa was 7 hours.

The amount of the terminal carboxyl group of the resulting polyester was 23 eq/ton, the amount of the terminal OH group was 82 eq/ton, and the contents of a carbonate bond, a urethane bond, an aliphatic monooxymonocarboxylic acid unit, and a phosphorus atom derived from a phosphorus-containing compound were each 0.

Main volatile components distilled out from the outlet for pressure reduction during the polymerization were water, succinic anhydride, tetrahydrofuran, and a small amount of 1,4-butanediol.

The resulting polymer was melted at 150° C. for 3 minutes and further pressed at 150° C. under 20 MPa for 2 minutes using a bench-type press machine to obtain a film having a thickness of about 150 μm. As a result of measurement of tensile elongation percentage at break using a test piece punched from the resulting film into a dumbbell shape (length 10 cm) (speed of drawing=200 mm/min, distance between marks=10 mm, distance between chucks=60 mm), the tensile elongation percentage was 500%.

Example 2-B

A polyester equal to that of Example 2-A was produced in the same scale as in Example 1-F. As a result of carrying out the test of tensile elongation at break on the resulting film, the tensile elongation percentages at break in the MD and TD directions were 560% and 400%, respectively, and anisotropy of the tensile elongation of the film was improved.

Example 3

Production of Polyester Having Malic Acid Content of $8.8 \times 10^{-3}$ mol % Relative to Succinic Acid

Example 3-A

A polyester having a reduced viscosity ($\eta sp/C$) of 2.04 was obtained under the same polycondensation conditions as in Example 1-C except that 100.3 g (0.85 mol) of succinic acid containing malic acid in an amount of 0.01% by weight and 76.6 g (0.85 mol) of 1,4-butanediol were fed and malic acid was not added. The polymerization reaction time under reduced pressure of $0.07 \times 10^3$ Pa was 5 hours.

The amount of the terminal carboxyl group of the resulting polyester was 11 eq/ton, the amount of the terminal OH group was 50 eq/ton, and the contents of a carbonate bond, a urethane bond, an aliphatic monooxymonocarboxylic acid unit, and a phosphorus atom derived from a phosphorus-containing compound were each 0.

Example 3-B

A polyester having a reduced viscosity ($\eta sp/C$) of 2.8 was obtained under the same polycondensation conditions as in Example 1-E except that 100.3 g (0.85 mol) of succinic acid containing malic acid in an amount of 0.01% by weight and 76.6 g (0.85 mol) of 1,4-butanediol were fed and malic acid was not added. The polymerization reaction time under reduced pressure of $0.07 \times 10^3$ Pa was 5.5 hours.

The amount of the terminal carboxyl group of the resulting polyester was 20 eq/ton, the amount of the terminal OH group was 33 eq/ton, and the contents of a carbonate bond, a urethane bond, an aliphatic monooxymonocarboxylic acid unit, and a phosphorus atom derived from a phosphorus-containing compound were each 0.

The resulting polymer was melted at 150° C. for 3 minutes and further pressed at 150° C. under 20 MPa for 2 minutes using a bench-type press machine to obtain a film having a thickness of about 150 μm. As a result of measurement of tensile elongation percentage at break using a test piece punched from the resulting film into a dumbbell shape (length 10 cm) (speed of drawing=200 mm/min, distance between marks=10 mm, distance between chucks=60 mm), the tensile elongation percentage was 500%.

Example 4

Production of Polyester Having Malic Acid Content of 0.64 mol % Relative to Succinic Acid As a result of production of a polyester in the same manner as in Example 1-A except that 100.3 g (0.85 mol) of succinic acid, 80.4 g (0.89 mol) of 1,4-butanediol, 0.37 g ($2.8 \times 10^{-3}$ mol) of malic acid, and 1.34 g ($2.8 \times 10^{-3}$ mol, 0.64 mol % relative to succinic acid as a whole) of 27.7% by weight of an aqueous malic acid solution in which germanium dioxide as a catalyst had been dissolved in an amount of 4% by weight beforehand were added at the feed of the starting materials in Example 1-A, a polyester having a reduced viscosity ($\eta sp/C$) of 2.8 was obtained. The polymerization reaction time under reduced pressure of $0.07 \times 10^3$ Pa was 1.5 hours. The amount of the terminal carboxyl group was 22 eq/ton, the amount of the terminal OH group was 60 eq/ton, and the contents of a carbonate bond, a urethane bond, an aliphatic monooxymonocarboxylic acid unit, and a phosphorus atom derived from a phosphorus-containing compound were each 0.

The resulting polymer was melted at 150° C. for 3 minutes and further pressed at 150° C. under 20 MPa for 2 minutes using a bench-type press machine to obtain a film having a thickness of about 150 μm. As a result of measurement of tensile elongation percentage at break using a test piece punched from the resulting film into a dumbbell shape (length 10 cm) (speed of drawing=200 mm/min, distance between marks=10 mm, distance between chucks=60 mm), the tensile elongation percentage was 300%.

Example 5

Durability Test of Polyester

Example 5-A (Production of Polyester A)

To a reaction vessel equipped with a stirring apparatus, a nitrogen inlet, a heating apparatus, a thermometer, and an outlet for pressure reduction were fed 100.3 g (0.85 mol) of succinic acid, 80.35 g (0.89 mol) of 1,4-butanediol, and 0.37 g ($2.8 \times 10^{-3}$ mol, 0.33 mol % relative to succinic acid) of malic acid as starting materials, and the inner system was made a nitrogen atmosphere by replacement with nitrogen under reduced pressure.

Then, the inner system was heated to 220° C. under stirring and they were reacted at this temperature for 1 hour. Thereafter, 0.4 g of a butanol solution containing 0.017 g (Ti content in the produced polymer: 8 ppm) of Orgatix TC-401 (titanium tetraacetylacetonate, manufactured by Matsumoto Trading Co., Ltd.) was added to the reaction system using a syringe, then the temperature was elevated to 230° C. over a period of 30 minutes and, at the same time, the pressure was reduced to $0.07 \times 10^3$ Pa over a period of 1 hour 30 minutes. Furthermore, 6.5 hours of the reaction was carried out under reduced pressure of $0.07 \times 10^3$ Pa to obtain a polyester. During the polycondensation reaction under reduced pressure, the outlet for pressure reduction of the reaction vessel was continued to heat at 130° C. The reduced viscosity ($\eta sp/C$) of the resulting polyester was 2.5, the amount of the terminal carboxyl group was 3 eq/ton, and the amount of the terminal OH group was 59 eq/ton.

(Formation and Evaluation of Film)

The resulting polymer was melted at 150° C. for 3 minutes and further pressed at 150° C. under 20 MPa for 2 minutes using a bench-type press machine to obtain a film having a thickness of about 150 μm. The resulting press film was placed in a constant temperature and humidity chamber of 50° C. and 90% R.H. and sampled at fixed intervals, and solution viscosity and tensile elongation percentage at break were measured.

The tensile test was carried out using a test piece punched from the film into a dumbbell shape (length 10 cm) (speed of drawing=200 mL/min, distance between marks=10 mm, distance between chucks=60 mm).

The results are shown in Table 1.

Example 5-B (Production of Polyester B)

To a reaction vessel equipped with a stirring apparatus, a nitrogen inlet, a heating apparatus, a thermometer, and an outlet for pressure reduction were fed 3420 g (29.0 mol) of succinic acid, 2689 g (29.8 mol) of 1,4-butanediol, and 45.64 g ($9.4 \times 10^{-2}$ mol, 0.33 mol % relative to succinic acid) of a 27.7% by weight aqueous malic acid solution in which germanium dioxide as a catalyst had been dissolved in an amount of 4% by weight as starting materials, and the inner system was made a nitrogen atmosphere by replacement with nitrogen under reduced pressure.

Then, the inner system was heated to 220° C. under stirring and they were reacted at this temperature for 1 hour. Thereafter, the temperature was elevated to 230° C. over a period of 30 minutes and, at the same time, the pressure was reduced to $0.07 \times 10^3$ Pa over a period of 1 hour 30 minutes. Furthermore, 2.5 hours of the reaction was carried out under reduced pressure of $0.07 \times 10^3$ Pa to obtain a white polyester. During the polycondensation reaction under reduced pressure, the outlet for pressure reduction of the reaction vessel was continued to heat at 110° C. The reduced viscosity ($\eta$sp/C) of the resulting polyester was 2.4, the amount of the terminal carboxyl group was 29 eq/ton, and the amount of the terminal OH group was 39 eq/ton.

(Formation and Evaluation of Film)

The formation and evaluation were carried out in the same manner as in Example 5-A. The results are shown in Table 1.

Example 5-C (Production of Polyester C)

To a reaction vessel equipped with a stirring apparatus, a nitrogen inlet, a heating apparatus, a thermometer, and an outlet for pressure reduction were fed 100.3 g (0.85 mol) of succinic acid, 80.35 g (0.89 mol) of 1,4-butanediol, and 0.37 g ($2.8 \times 10^{-3}$ mol, 0.33 mol % relative to succinic acid) of malic acid as starting materials, and the inner system was made a nitrogen atmosphere by replacement with nitrogen under reduced pressure.

Then, the inner system was heated to 220° C. under stirring and they were reacted at this temperature for 1 hour. Thereafter, 0.4 g of a butanol solution containing 0.214 g (Ti content in the produced polymer: $1 \times 10^2$ ppm) of Orgatix TC-401 (titanium tetraacetylacetonate, manufactured by Matsumoto Trading Co., Ltd.) was added to the reaction system using a syringe, then the temperature was elevated to 230° C. over a period of 30 minutes and, at the same time, the pressure was reduced to $0.07 \times 10^3$ Pa over a period of 1 hour 30 minutes. Furthermore, 3.5 hours of the reaction was carried out under reduced pressure of $0.07 \times 10^3$ Pa to obtain a polyester. During the polycondensation reaction under reduced pressure, the outlet for pressure reduction of the reaction vessel was continued to heat at 130° C. The reduced viscosity ($\eta$sp/C) of the resulting polyester was 2.4, the amount of the terminal carboxyl group was 15 eq/ton, and the amount of the terminal OH group was 69 eq/ton.

(Formation and Evaluation of Film)

The formation and evaluation were carried out in the same manner as in Example 5-A. The results are shown in Table 1.

TABLE 1

| | | | Days of storage | | | |
|---|---|---|---|---|---|---|
| | | | 0 day | 7 days | 21 days | 28 days |
| Example 5-A | Polyester A | $\eta$sp/C | 2.5 | 2.5 | 2.4 | 2.3 |
| | | Elongation (%) | 400 | 300 | 300 | 300 |
| Example 5-B | Polyester B | $\eta$sp/C | 2.4 | 2.0 | 1.6 | 1.4 |
| | | Elongation (%) | 400 | 0 | 0 | 0 |
| Example 5-C | Polyester C | $\eta$sp/C | 2.4 | 2.2 | 1.9 | 1.7 |
| | | Elongation (%) | 400 | 0 | 0 | 0 |

Comparative Example 1

Production of Polyester Containing No Component of an Organic Acid Having a pKa Value of 3.7 or Below at 25° C.

Comparative Example 1-A

A polycondensation reaction was carried out in the same manner as in Example 1-A except that, at the feed of starting materials, a 0.33% by weight aqueous germanium dioxide solution (15.15 g) was fed to a mixture of 100.3 g (0.85 mol) of succinic acid and 76.5 g (0.85 mol) of 1,4-butanediol in Example 1-A. The polymerization reaction was carried out under reduced pressure of $0.07 \times 10^3$ Pa for 4.5 hours but only a polyester having a low viscosity (reduced viscosity ($\eta$sp/C): 0.63) was obtained.

Comparative Example 1-B

A polycondensation reaction was carried out in the same manner as in Example 1-A except that, at the feed of starting materials, a 0.33% by weight aqueous germanium dioxide solution (15.15 g) was fed to a mixture of 100.3 g (0.85 mol) of succinic acid and 78.8 g (0.87 mol) of 1,4-butanediol in Example 1-A. The polymerization reaction was carried out under reduced pressure of $0.07 \times 10^3$ Pa for 4.5 hours but a polyester having a viscosity higher than the viscosity obtained in Comparative Example 1-A was not obtained.

Comparative Example 2

Production of Polyester Having Malic Acid Content of 0.33 mol % Relative to Succinic Acid A polycondensation reaction was carried out in the same manner as in Example 1-A except that 88.8 g (0.98 mol) of 1,4-butanediol was fed instead of 78.8 g (0.87 mol) of 1,4-butanediol in Example 1-A. The polymerization reaction was carried out under reduced pressure of $0.07 \times 10^3$ Pa for 4.5 hours but a polyester having a viscosity higher than the viscosity obtained in Comparative Example 1-A was not obtained.

Comparative Example 3

Production of Polyester Having Malic Acid Content and Lactic Acid Content of 0.03 mol % and 6.2 mol %, Respectively, Relative to Succinic Acid A polycondensation reaction was carried out in the same manner as in Example 1-A except that a 90% aqueous lactic acid solution (5.31 g, 0.053 mol) in which germanium dioxide as a catalyst had been dissolved in an amount of 1.0% by weight beforehand was fed to a mixture of 100.3 g (0.85 mol) of succinic acid, 0.035 g ($2.6 \times 10^{-4}$ mol, 0.04 mol % relative to succinic acid as a whole) of malic acid, and 84.18 g (0.93 mol) of 1,4-butanediol in Example 1-A. An increase of stirring torque was observed until about 4 hours of the polymerization reaction under reduced pressure of $0.07 \times 10^3$ Pa (empirically, the reduced viscosity ($\eta sp/C$) was about 1.9) but since then, a decrease of stirring torque was observed together with distilling out a lactic acid component. Furthermore, after 1 hour of the reaction, the reduced viscosity ($\eta sp/C$) of the resulting polyester was 1.5.

While the invention has been described in detail and with reference to specific embodiments thereof, it will be apparent to one skilled in the art that various changes and modifications can be made therein without departing from the spirit and scope thereof.

The present application is based on Japanese Patent Application No. 2003-142914 filed on May 21, 2003, and the contents are incorporated herein by reference.

INDUSTRIAL APPLICABILITY

According to the present invention, there can be provided a polyester which is produced as a sufficiently high-molecular-weight one by a simple and convenient production process without using a chain extender such as an isocyanate compound or a carbonate compound and a large amount of a branching agent, an acidic phosphorus compound, and the like causing decrease in physical properties such as thermal stability and which has sufficient tensile properties, especially tensile elongation property of molded film and thermal stability.

The invention claimed is:

1. An aliphatic polyester which comprises an aliphatic diol unit, an aliphatic dicarboxylic acid unit and a unit of an organic acid having a pKa value of 3.7 or below at 25° C., wherein a content of a carbonate bond contained in the polyester is less than 1 mol %, a content of a urethane bond is less than 0.06 mol %, a content of an aliphatic monooxy-monocarboxylic acid unit is less than 0.02 mol %, a content of the phosphorus atom derived from a phosphorus compound selected from among an organic phosphinic acid, an organic phosphonic acid, and a hydrogen phosphate salt is less than $10^{-9}$ mol %, based on the whole monomer units constituting the polyester, and a reduced viscosity ($\eta sp/C$) is 1.6 or more,
   wherein the content of the unit of the organic acid having a pKa value of 3.7 or below at 25° C. is from 0.0001 to 0.4 mol %, based on the aliphatic dicarboxylic acid unit.

2. The aliphatic polyester according to claim 1, wherein the aliphatic diol unit is an ethylene glycol unit and/or a 1,4-butanediol unit.

3. The aliphatic polyester according to claim 1, wherein the aliphatic dicarboxylic acid unit is adipic acid and/or succinic acid.

4. The aliphatic polyester according to claim 1, wherein the unit of the organic acid having a pKa value of 3.7 or below at 25° C. is at least one selected from among malic acid, tartaric acid, citric acid, maleic acid, and fumaric acid.

5. The aliphatic polyester according to claim 1, wherein the number of terminal COOH groups in the aliphatic polyester is 50 eq/ton or less.

6. The aliphatic polyester according to claim 1, wherein a retention rate of the reduced viscosity is 80% or more when the aliphatic polyester is transformed into a film-shape test piece having a thickness of 150±25 μm and the test piece is kept under conditions of a temperature of 50° C. and a relative humidity of 90% R.H. for 28 days.

7. A process for producing the aliphatic polyester according to claim 1, wherein an organic acid having a pKa value of 3.7 or below at 25° C., an aliphatic dicarboxylic acid and/or a derivative thereof, and an aliphatic diol are esterified and/or ester-exchanged and then melt polycondensation is carried out with no solvent in the presence of a polymerization catalyst dissolved or melted.

8. The process for producing an aliphatic polyester according to claim 7, wherein the catalyst contains an element of the Groups 3 to 6 of the periodic table.

9. The process for producing an aliphatic polyester according to claim 7, wherein an amount of the polymerization catalyst to be used is from 5 ppm to 30,000 ppm as a metal amount based on the aliphatic polyester formed.

10. The process for producing an aliphatic polyester according to claim 7, wherein the melt polycondensation is carried out under reduced pressure of $0.03 \times 10^3$ Pa to $1.4 \times 10^3$ Pa at a temperature of 180° C. to 250° C.

11. The process for producing an aliphatic polyester according to claim 7, wherein the melt polycondensation is carried out with removing at least one of the aliphatic dicarboxylic acids and acid anhydrides thereof.

12. The process for producing an aliphatic polyester according to claim 11, wherein the melt polycondensation is carried out using a stirring vessel-type reactor equipped with an outlet for pressure reduction and with maintaining the temperature of the outlet at a temperature equal to or higher than an either lower temperature of the melting point of the aliphatic dicarboxylic anhydride or the boiling point of the aliphatic dicarboxylic anhydride under the degree of vacuum at the polycondensation reaction.

13. The aliphatic polyester according to claim 1, which contains substantially no chain extender.

14. The aliphatic polyester according to claim 1, wherein the unit of the organic acid having a pKa value of 3.7 or below at 25° C. is malic acid.

15. The aliphatic polyester according to claim 1, wherein the content of the unit of the organic acid having a pKa value of 3.7 or below at 25° C. is from 0.0001 to 0.35 mol %, based on the aliphatic dicarboxylic acid unit.

16. The aliphatic polyester according to claim 1, wherein the content of the unit of the organic acid having a pKa value of 3.7 or below at 25° C. is from 0.0001 to 0.30 mol %, based on the aliphatic dicarboxylic acid unit.

17. The aliphatic polyester according to claim 1, wherein the content of the unit of the organic acid having a pKa value of 3.7 or below at 25° C. is from 0.0001 to 0.25 mol %, based on the aliphatic dicarboxylic acid unit.

18. An article comprising the aliphatic polyester according to claim 1.

19. A film comprising the aliphatic polyester according to claim 1.

* * * * *